United States Patent [19]

Belart

[11] 4,283,994
[45] Aug. 18, 1981

[54] POWER BRAKE UNIT

[75] Inventor: Juan Belart, Walldorf, Fed. Rep. of Germany

[73] Assignee: ITT Industries, Inc., New York, N.Y.

[21] Appl. No.: 57,763

[22] Filed: Jul. 16, 1979

[30] Foreign Application Priority Data

Aug. 3, 1978 [DE] Fed. Rep. of Germany ....... 2834018

[51] Int. Cl.³ ..................... F15B 17/02; F15B 13/14; F15B 13/10
[52] U.S. Cl. .................................. 91/391 R; 91/434; 91/460; 60/547 R
[58] Field of Search ..................... 91/391 R, 460, 434, 91/373, 372; 60/548, 547 R

[56] References Cited

U.S. PATENT DOCUMENTS

| 3,075,499 | 1/1963 | Prather | 91/391 R |
|---|---|---|---|
| 3,113,489 | 12/1963 | Cruse et al. | 91/460 |
| 3,831,491 | 8/1974 | Thomas | 91/391 R |
| 3,838,629 | 10/1974 | Meyers | 91/391 R |
| 3,915,066 | 10/1975 | Thomas et al. | 91/391 R |

Primary Examiner—Paul E. Maslousky
Attorney, Agent, or Firm—John T. O'Halloran; Alfred C. Hill

[57] ABSTRACT

A power brake unit for automotive vehicles comprising a brake valve through which pressure-transmitting fluid is metered from a fluid source into a booster chamber to actuate a booster piston. A hydraulic transmission ratio provided by an input piston connected to a brake pedal and an operating piston connected to the brake valve reduces the pedal actuating travel when the fluid source is intact and is ineffective in the event of a failure of the fluid source. Only non-boosted forces are transmitted through the hydraulic transmission ratio. Should the fluid source fail, the hydraulic transmission ratio is rendered inoperative in a simple and safe manner.

20 Claims, 1 Drawing Figure

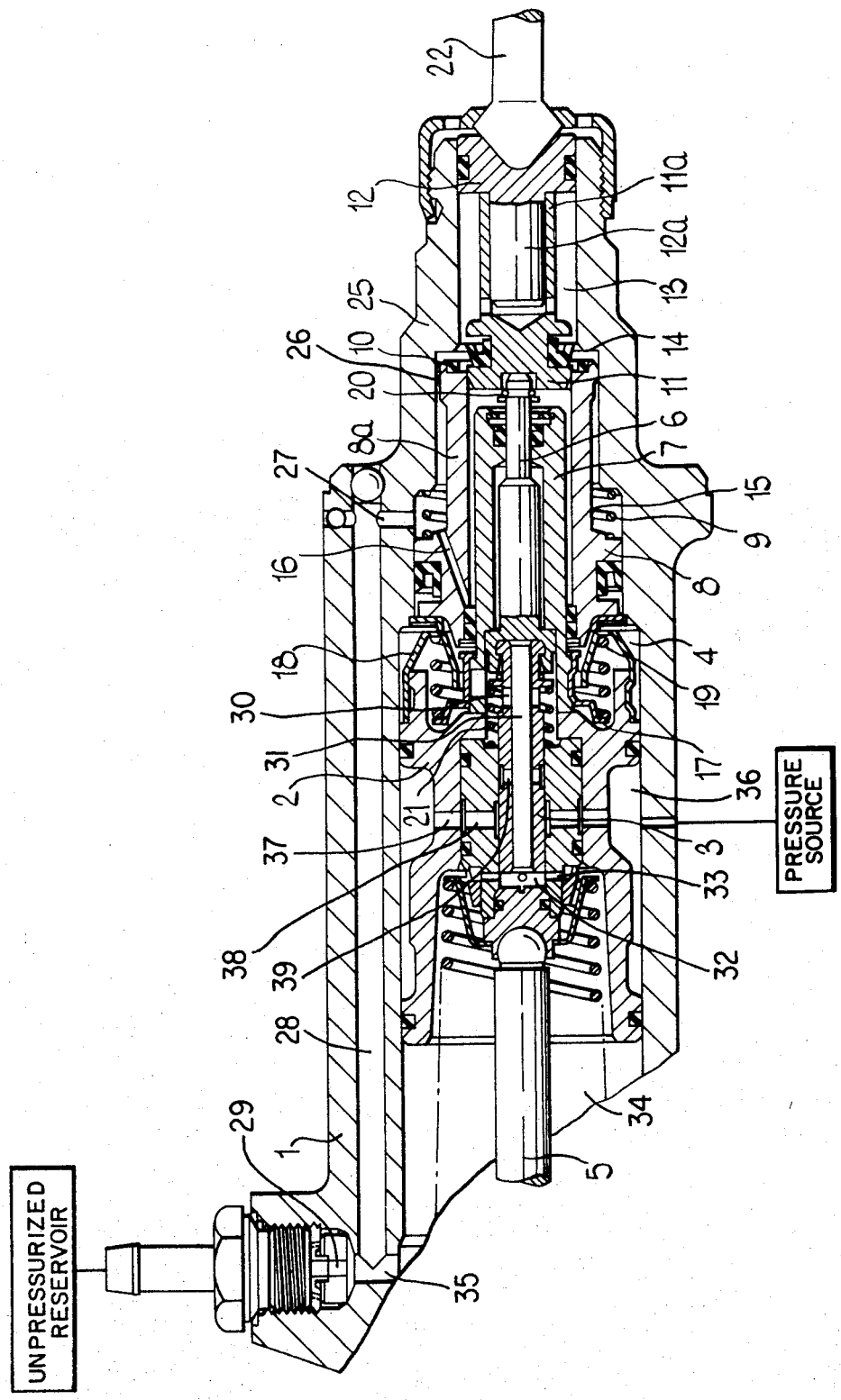

POWER BRAKE UNIT

BACKGROUND OF THE INVENTION

This invention relates to a power brake unit for automotive vehicles including a brake valve which is adapted to meter pressure-transmitting fluid from a pressure source into a booster chamber to act upon a booster piston, and wherein a hydraulic transmission ratio reducing the actuating travel when the pressure source is intact is provided, the transmission ratio being without effect in the event of failure of the pressure source. A power brake unit of this type is known from German Pat. No. DE-OS No. 2,460,529.

In this known device, the hydraulic transmission ratio is rendered inoperative by being put out of circuit if the pressure source fails in order to thus alter the transmission ratio. This is necessary to permit the highest possible brake pressure to be built up with a relatively low pedal force and without the assistance of auxiliary energy, utilizing the maximum permissible pedal travel. If the transmission ratio was constant in a brake system designed for operation without auxiliary energy, the additional effect of the auxiliary energy would cause the pedal to be stepped down to the floorboard of the vehicle so that a further pressure build-up would be prevented as a result of this limited pedal travel.

The disconnectible transmission ratio is embodied in the power brake unit of the above-cited German Patent by arranging for the booster piston to have its one effective surface close to the master-cylinder piston in an intermediate pressure chamber, this surface being of a cross section greater than the effective surface of the master-cylinder piston facing it, and by arranging for the intermediate pressure chamber to be connectible with the working chamber in front of the master-cylinder piston through a valve arrangement.

A disadvantage of this known power brake unit is that the valve arrangement necessary for connecting and disconnecting the hydraulic transmission ratio necessitates substantial additional costs on the one hand and on the other hand it may be the cause of failure of the power brake unit by remaining in a permanently open or permanently closed position because of a defect. If such a defect occurs, sufficient deceleration of the vehicle is no longer possible using the pedal force alone when the auxiliary energy has failed, or, in the presence of the auxiliary energy, the brake pedal travels down to the floorboard, thereby limiting the further build-up of pressure.

Another disadvantage of the known power brake unit is that the hydraulic transmission ratio is situated between the master cylinder and the booster. In the normally intact power brake unit, this results initially in the translation of a high mechanical force with a small stroke into a corresponding lower force with a greater stroke. Consequently, the booster must be designed for forces which are not at all necessary. This results in an over-sized booster piston or an unnecessarily high level for the pressure source.

SUMMARY OF THE INVENTION

An object of the present invention is to provide a power brake unit of the type referred to hereinabove wherein the hydraulic transmission ratio is only used for the transmission of non-boosted forces and becomes inoperative in the event of failure of the pressure source in a simple and safe way.

A feature of the present invention is the provision of a power brake unit for automotive vehicles comprising a housing having a longitudinal axis and a longitudinal bore coaxial of the axis; a booster piston disposed in a slidably sealed relation in the bore coaxial of the axis; an annular piston disposed in a slidably sealed relation in the bore coaxial of the axis having one end thereof spaced from an adjacent end of the booster piston; a brake valve disposed coaxially of the axis within the booster piston to meter pressure-transmitting fluid from a pressure source into a booster chamber disposed between the one end of the annular piston and the adjacent end of the booster piston, the fluid in the booster chamber acting on the booster piston in an actuating direction and on the annular piston in a direction opposite the actuating direction; an input piston connected to a brake pedal disposed in a slidably sealed relation in the bore coaxial of the axis in a spaced relation with the other end of the annular piston; and an operating piston connected to the brake valve disposed coaxial of the axis within the other end of the annular piston; the input piston and the operating piston providing therebetween a hydraulic transmission ratio to reduce actuating travel when the pressure source is intact, the transmission ratio being ineffective in the event of failure of the pressure source, the diameter of the input piston being greater than the diameter of the operating piston and the diameter of the annular piston being no smaller than the diameter of the input piston.

In this arrangement, the hydraulic transmission ratio is only effective if the annular piston is held in opposition to the actuating direction by the pressure from the pressure source. It is thereby ensured that the transmission ratio becomes inoperative immediately should the pressure fail. It is not necessary for a valve to change its position. With the power brake unit intact, only the actuating force of the vehicle operator is transmitted via the hydraulic transmission ratio.

The power brake unit of the present invention permits a particularly compact construction because the booster chamber which is bounded by the booster piston on its one side has the annular piston as its boundary on the other side, so that the annular piston has its surface closest to the booster chamber subjected to the pressure metered into the booster chamber from the pressure source against the actuating direction and bears upon a stop formed in the housing. The necessity of providing a separate pressure chamber for actuation of the annular piston is thereby obviated. Moreover, the annular piston and its seals are subjected to load only when the brakes are applied, because it is not directly subjected to the pressure from the pressure source but only to the pressure fluid which is metered into the booster chamber from the pressure source via the brake valve. In addition, the amount of pressure bearing upon the annular piston is thereby limited to the extent necessary at the time.

In an advantageous embodiment, the annular piston has a diameter greater than that of the input piston, is normally spaced from the stop formed in the housing by a return spring and includes a sealing member adapted to close, at the stop formed in the housing, a connection between the transmission chamber enclosed by the input piston, the operating piston as well as by the annular piston, and a return reservoir. This ensures that the transmission chamber becomes always completely unpressurized when the power brake unit is not activated and that no vacuum can develop. Any losses of fluid in the transmission chamber are compensated for by fluid from the return reservoir.

Because the annular piston has a stepped extension carrying the sealing member and the return spring is located between the step and the housing, the operating piston is provided with a relatively large slide length with the outer dimensions of the entire power brake unit being kept small at the same time. It will be an advantage to provide the operating piston with a sleeve-shaped extension carrying therein an axial pin of the input piston. This enables the operating piston and the input piston to be of short length without there being the risk of a jammed condition. Because the bottom area of the sleeve-shaped extension is in permanent communication with the transmission chamber through a cross bore, the operating piston and the input piston telescope accurately without disturbances occuring due to fluid being entrapped.

The volume is balanced on either side of the operating piston by providing the operating piston with a seal which cooperates with the annular piston and enters the interior of the annular piston only as the operating piston moves in the actuating direction.

A particularly advantageous transmission of force from the operating piston to the brake valve is obtained by arranging for the operating piston in the annular piston to bear upon a tappet sealed to and slidably guided out of the annular piston and extending into the booster chamber, the tappet being connected in the booster chamber with a valve spool forming the brake valve in the booster piston. In this arrangement, the operating piston is not directly exposed to the pressure in the booster chamber. By arranging the tappet in a sleeve in a sealed and slidable relationship thereto, the sleeve being in turn sealed to and slidable in the annular piston, and to arrange for the sleeve to bear upon the operating piston against the actuating direction, the reaction force which is responsive to the pressure in the booster chamber and acts on the operating piston can be varied by a particularly simple design. A straightforward assembly results if the sleeve bears against the operating piston via the tappet.

It is suitable in this arrangement to provide a channel connecting the area in the annular piston between a seal towards the booster chamber and the operating piston with the annular chamber which is formed by the step on the annular piston and in permanent communication with the unpressurized reservoir, in order to ensure perfect volume compensation.

In a special improvement, the sleeve is preloaded in the direction of the booster piston by means of a spring. It is achieved by this arrangement that on commencement of a braking action a reaction force acts on the operating piston which force is initially responsive to the pressure in the booster chamber and determined by the small cross section of the tappet, so that initially a specific brake pressure develops very easily whereby the brakes are applied. Only when the pressure in the booster chamber is of a magnitude sufficient to overcome the spring will the force determined by the cross section of the sleeve be transmitted to the operating piston, and the normal reaction force will make itself felt at the brake pedal as the pressure build-up continues. This effect is of particular importance in cars equipped with an automatic transmission system, for example. With such cars which continuously tend to roll away with the driving position engaged, it would be possible to counteract this tendency by lightly touching the brake. On the other hand, it would also be possible with such cars to obtain a good brake feel with the corresponding reaction force at higher braking torques.

If in this arrangement the spring is engaged between the sleeve and the booster piston, the spring's influence on the power brake unit ceases as soon as the sleeve bears against the operating piston.

A particularly simple design to achieve this is to provide the sleeve with a hollow mushroom-shaped extension and the booster piston with a cap fitting over the mushroom-shaped extension and to engage the spring between the extension and the cap.

BRIEF DESCRIPTION OF THE DRAWING

The above-mentioned and other features and objects of the present invention and the manner of obtaining them will become more apparent by reference to the following description taken in conjunction with the drawing, the single FIGURE of which is a longitudinal cross-section of an embodiment of a power brake unit in accordance with the principles of the present invention with a conventional master cylinder forming part of the power brake unit not being shown.

DESCRIPTION OF THE PREFERRED EMBODIMENT

Referring to the FIGURE, the housing accommodates booster piston 2 slidably sealed to an internal bore of housing 1. A valve spool 3 is coaxially disposed in booster piston 2. Valve spool 3 forms in booster piston 2 in the known manner a brake valve through which a booster chamber 4 bounded by booster piston 2 is connectible with a pressure source or an unpressurized return reservoir, so that a predetermined boosting pressure can be metered into booster chamber 4 in response to an actuating force. On the side of booster piston 2 remote from booster chamber 4 is a master cylinder not shown which is operable via a thrust member 5.

On its side opposite booster piston 2, booster chamber 4 is bounded by a tappet 6, a sleeve 7 and an annular piston 8. In this arrangement, tappet 6 is sealed to and slidably guided in sleeve 7 which in turn is sealed to and slidably guided in annular piston 8. Annular piston 8 is axially movable in housing 1 and preloaded in the direction of booster piston 2 by means of a return spring 9. Annular piston 8 has a stepped extension 8a extending away from booster piston 2 and carrying on its front end a sealing member 10. Extension 8a has on its outer periphery adjacent sealing member 10 axial channels 26 formed therein to provide fluid passages therethrough.

Sealed to and slidable in annular piston 8 is an operating piston 11 bearing against tappet 6 and having a sleeve-shaped extension 11a extending in a direction opposed to the actuating direction. A pin 12a of an input piston 12 projects into extension 11a. The diameter of input piston 12 is greater than that of operating piston 11 and smaller than that of annular piston 8. Formed between annular piston 8, operating piston 11 and input piston 12 is a transmission chamber 13 which is normally connected with an unpressurized return reservoir past sealing member 10. Sealing member 10 through axial channels 26, a radial bore 27, an axial bore 28 and pressure line coupling 29 is arranged to close this connection at a stop 14 formed in housing 1 so that only an annular chamber 15 formed by the step of annular piston 8 communicates with the return reservoir through bores 27 and 28 and coupling 29. From this annular chamber 15, a channel 16 leads into the interior of annular piston 8 in order to ensure volume compensation for the area in annular piston 8 between the seals adjacent booster chamber 4 and the seal of operating piston 11.

Secured to sleeve 7 in booster chamber 4 is a hollow mushroom-shaped extension 17 which is overlapped by a cap 8 fitted to the booster piston 2. Engaged between extension 17 and cap 18 is a spring 19 preloading sleeve 7 away from a stop 20 secured to tappet 6 in the direction of booster piston 2. In booster chamber 4 valve spool 3 is secured to tappet 6 and preloaded opposite the actuating direction by a spring 21.

The mode of operation of the embodiment illustrated in the FIGURE is as follows:

In the inactivated state of the power brake unit all parts are in their illustrated positions. Booster chamber 4 is in communication with the unpressurized return reservoir through radial bore 30 and axial bore 31 of valve spool 3 chamber 32, radial bore 33, return chamber 34, radial bore 35 in housing 1 and coupling 29. Transmission chamber 13 is in communication with the unpressurized return reservoir by the passage between sealing member 10 and stop 14, axial channels 26, bores 27 and 28 and coupling 29 in a known manner.

When a braking action is initiated, input piston 12 is actuated by the vehicle operator via a thrust member 22. Operating piston 11 is thereby displaced purely mechanically initially because the fluid displaced in transmission chamber 13 flows past sealing member 10 to the return reservoir. Via tappet 6, operating piston 11 causes valve spool 3 to assume a position in which bore 33 is closed and fluid is metered into booster chamber 4 from the pressure source via chamber 36, radial bores 37, 38, 39 and 30 and axial bore 31. Pressure thus starts building up in booster chamber 4.

The pressure developing in booster chamber 4 acts on booster piston 2 to actuate the master cylinder. Simultaneously, annular piston 8 is acted upon in opposition to the actuating direction and it shifts at a relatively low pressure against return spring 9 until its extension 8a abuts stop 14. Sealing member 10 thereby closes the connection from transmission chamber 13 to the return reservoir. The pressure in booster chamber 4 causes a reaction force, which is determined by the cross section of tappet 6, to act upon operating piston 11 and thus counteracts the further actuation. Because of the small cross-section of tappet 6, this force is, however, very low so that the vehicle operator need not apply substantial actuating forces for a low braking torque in order to keep the vehicle stopped. Sleeve 7, which is likewise subjected to the pressure in booster chamber 4, is intially held in abutment with booster piston 2 by spring 19 so that no reaction force which the operator is able to feel is initially produced via it.

As the vehicle operator continues applying the brake, operating piston 11 is displaced a greater amount than input piston 12 because transmission chamber 13 is meanwhile closed and annular piston 8 is held in abutment with stop 14. This means the actuating travel afforded by the vehicle operator on the brake pedal is transmitted hydraulically so that the pedal travel can be kept small. Thus, a higher pressure develops in booster chamber 4 which leads to a correspondingly increased brake pressure.

When the pressure in booster chamber 4 has reached a predetermined limit, the force of spring 19 is overcome and sleeve 7 is displaced into abutment with stop 20 on tappet 6 opposite the actuating direction. From this moment on the reaction force acting on operating piston 11 is determined by the areas of sleeve 7 and of tappet 6. When higher brake pressures are produced, the vehicle operator is thus provided with a good "brake feel".

When the brake is released, all parts return to their illustrated inactivated positions in the reverse order.

In the event of a failure of the pressure source, no pressure builds up in booster chamber 4. Annular piston 8 does not move into abutment with stop 14 and transmission chamber 13 is not closed so that no transmission can take place because the development of pressure in transmission chamber 13 is not possible and the hydraulic transmission remains without effect. The operator's actuating force is transmitted purely mechanically from input piston 12 via operating piston 11, tappet 6 and valve spool 3 to booster piston 2, so that the entire pedal travel available can be made use of.

The hydraulic transmission remains without effect in the event of failure of the pressure source also if—different from the illustrated embodiment—transmission chamber 13 is always closed by annular piston 8 and not connectible with the return reservoir. In such a design, annular piston 8 is simply made to follow without any force being applied because in that event it does not encounter a resistance in booster chamber 4.

While I have described above the principles of my invention in connection with specific apparatus it is to be clearly understood that this description is made only by way of example and not as a limitation to the scope of my invention as set forth in the objects thereof and in the accompanying claims.

I claim:

1. A power brake unit for automotive vehicles comprising:
   a housing having a longitudinal axis and a longitudinal bore coaxial of said axis;
   a booster piston disposed in a slidably sealed relation in said bore coaxial of said axis;
   an annular piston disposed in a slidably sealed relation in said bore coaxial of said axis having one end thereof spaced from an adjacent end of said booster piston;
   a brake valve disposed coaxially of said axis within said booster piston to meter pressure-transmitting fluid from a pressure source into a booster chamber disposed between said one end of said annular piston and said adjacent end of said booster piston, said fluid in said booster chamber acting on said booster piston in an actuating direction and on said annular piston in a direction opposite said actuating direction;
   an input piston connected to a brake pedal disposed in a slidably sealed relation in said bore coaxial of said axis in a spaced relation with the other end of said annular piston; and
   an operating piston connected to said brake valve disposed coaxial of said axis within said other end of said annular piston;
   said input piston and said operating piston providing therebetween a hydraulic transmission ratio to reduce actuating travel of said brake pedal when said pressure source is intact, said transmission ratio being ineffective in the event of failure of said pressure source, the diameter of said input piston being greater than the diameter of said operating piston and the diameter of said annular piston being no smaller than the diameter of said input piston.

2. A unit according to claim 1, wherein said annular piston is moved in said direction opposite said actuating direction by said metered pressure until it bears against a stop formed in the wall of said bore adjacent said operating piston.

3. A unit according to claim 2, wherein said annular piston has a diameter greater than the diameter of said input piston, is normally spaced from said stop by a return spring and includes a sealing member adapted to close at said stop a connection between a transmission chamber and a return reservoir, said transmission chamber being disposed in said bore bounded by said input piston and said operating piston.

4. A unit according to claim 3, wherein said annular piston includes a stepped extension carrying said sealing member, and said return spring is disposed between the step of said stepped extension and an adjacent step in said bore.

5. A unit according to claim 4, wherein said operating piston is provided with a sleeve-shaped extension carrying therein an axial pin of said input piston.

6. A unit according to claim 5, wherein the interior of said sleeve-shaped extension is in permanent communication with said transmission chamber through a cross bore.

7. A unit according to claim 6, wherein said operating piston includes a first seal cooperating with said annular piston, said seal entering the interior of said annular piston only when said operating piston moves in said actuating direction.

8. A unit according to claim 7, wherein said operating piston bears against a tappet within said annular piston, said tappet being sealed to and slidably guided out of said annular piston and extending into said booster chamber, said tappet being connected in said booster chamber with said brake valve in the form of a valve spool.

9. A unit according to claim 8, wherein said tappet is disposed in a sleeve in a sealed slidable relationship thereto, said sleeve being in a sealed, slidable relation within said annular piston and adapted to bear against said operating piston in said direction opposite said actuating direction.

10. A unit according to claim 9, wherein said sleeve bears against said operating piston via said tappet.

11. A unit according to claim 10, further including a channel connecting an area in said annular piston disposed between a second seal adjacent said booster between said sleeve and said annular piston and said operating piston with an annular chamber formed by the step of said stepped extension and said adjacent step in said bore which is in permanent communication with said return reservoir.

12. A unit according to claim 9, wherein said sleeve is preloaded toward said booster piston by means of a second spring.

13. A unit according to claim 12, wherein one end of said second spring bears against said sleeve and the other end of said second spring bears against said booster piston.

14. A unit according to claim 13, wherein said sleeve includes
a hollow mushroom-shaped extension extending from an end thereof adjacent said booster piston, said booster piston includes
a cap extending from an end thereof adjacent said sleeve and fitting over said mushroom-shaped extension, and
said second spring is engaged between said mushroom-shaped extension and said cap.

15. A unit according to claim 1, wherein said operating piston bears against a tappet within said annular piston, said tappet being sealed to and slidably guided out of said annular piston and extending into said booster chamber, said tappet being connected in said booster chamber with said brake valve in the form of a valve spool.

16. A unit according to claim 15, wherein said tappet is disposed in a sleeve in a sealed slidable relationship thereto, said sleeve being in a sealed, slidable relation within said annular piston and adapted to bear against said operating piston in said direction opposite said actuating direction.

17. A unit according to claim 16, wherein said sleeve bears against said operating piston via said tappet.

18. A unit according to claim 16, wherein said sleeve is preloaded toward said booster piston by means of a spring.

19. A unit according to claim 18, wherein one end of said second spring bears against said sleeve and the other end of said second spring bears against said booster piston.

20. A unit according to claim 19, wherein said sleeve includes
a hollow mushroom-shaped extension extending from an end thereof adjacent said booster piston, said booster piston includes
a cap extending from an end thereof adjacent said sleeve and fitting over said mushroom-shaped extension, and
said second spring is engaged between said mushroom-shaped extension and said cap.

* * * * *